Nov. 10, 1959   J. D. DANNER ET AL   2,912,351
LENS COATING APPARATUS AND PROCESS
Filed Sept. 21, 1956   4 Sheets-Sheet 1
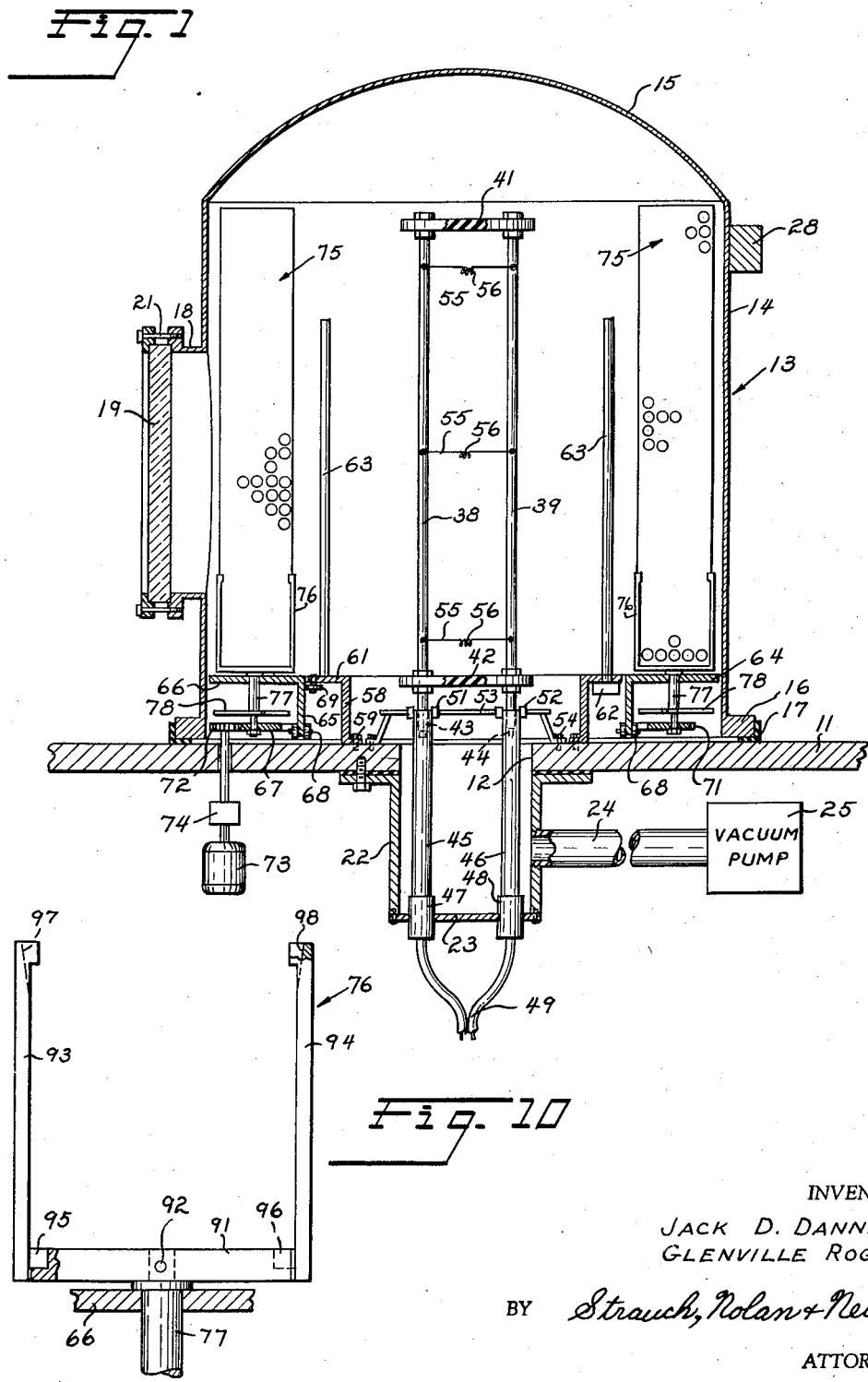
INVENTOR
JACK D. DANNER
GLENVILLE ROGERS
BY Strauch, Nolan & Neale
ATTORNEYS Nov. 10, 1959  J. D. DANNER ET AL  2,912,351
LENS COATING APPARATUS AND PROCESS
Filed Sept. 21, 1956  4 Sheets-Sheet 2
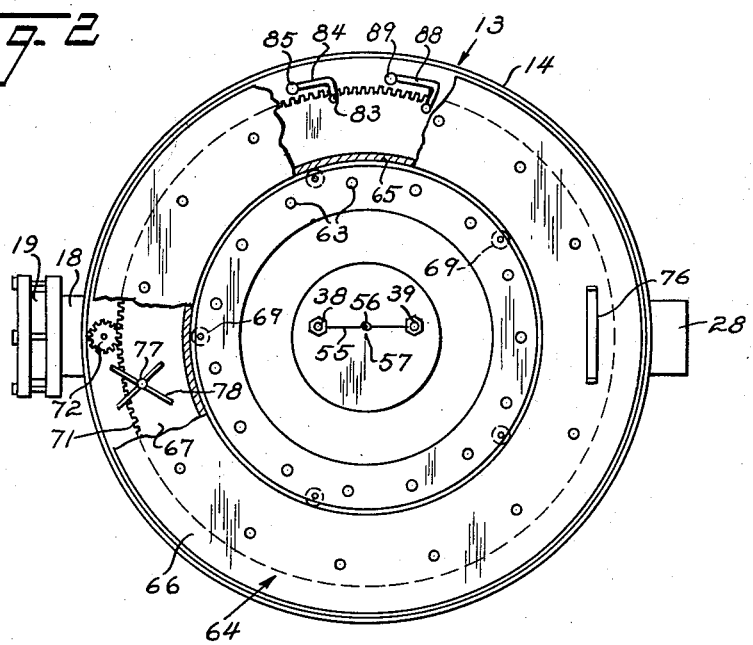
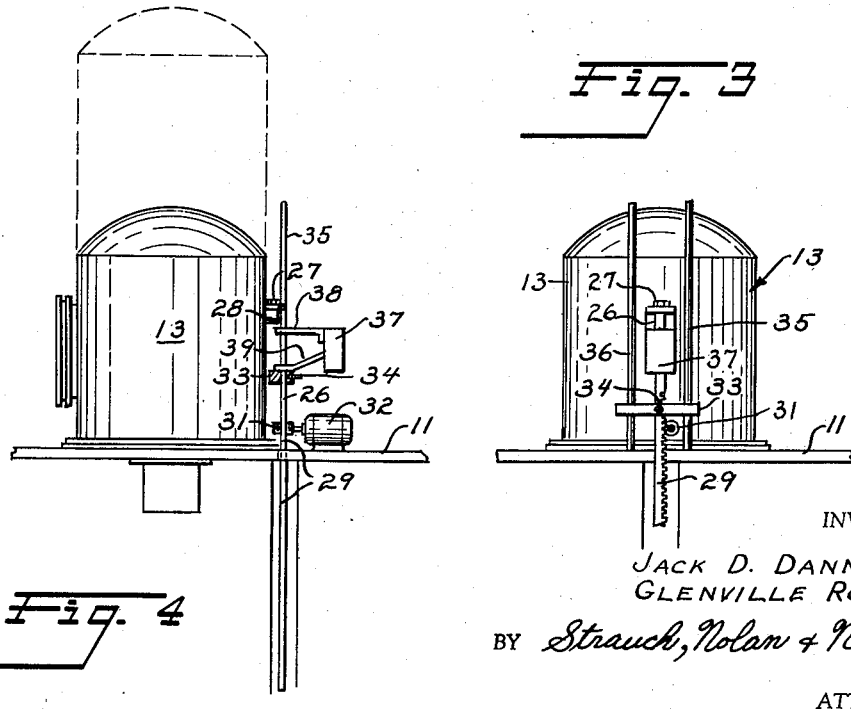
INVENTOR
JACK D. DANNER
GLENVILLE ROGERS
BY Strauch, Nolan + Neale
ATTORNEYS

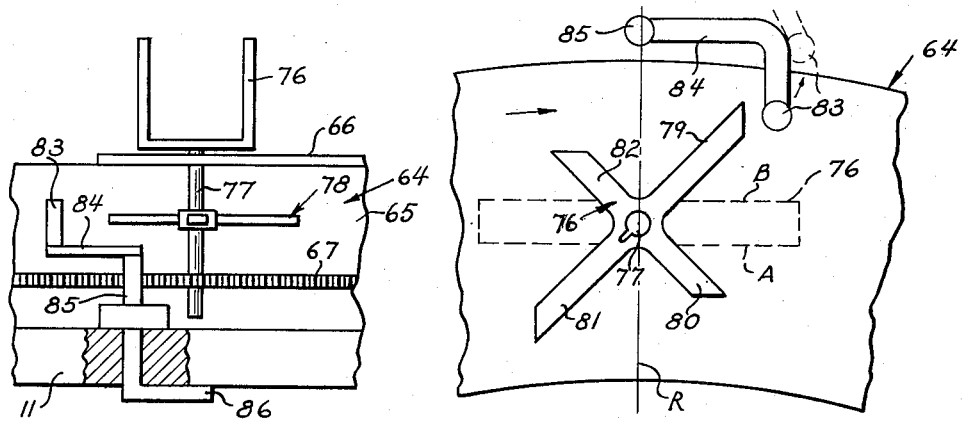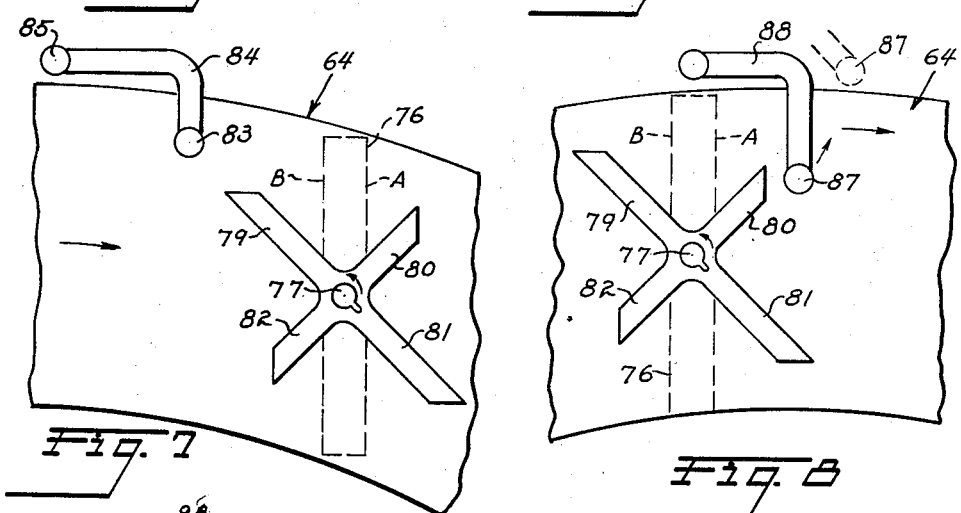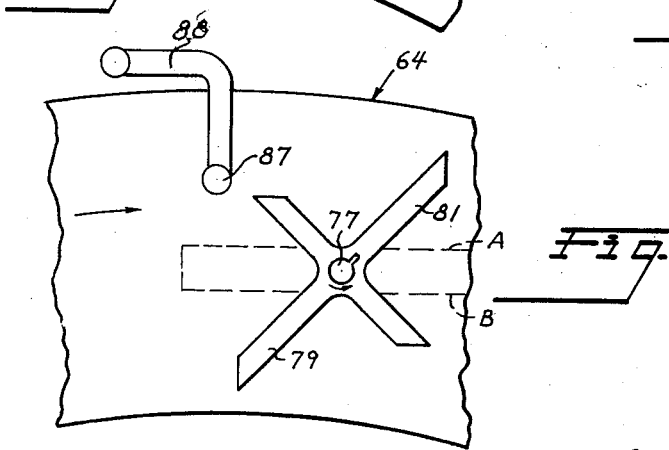

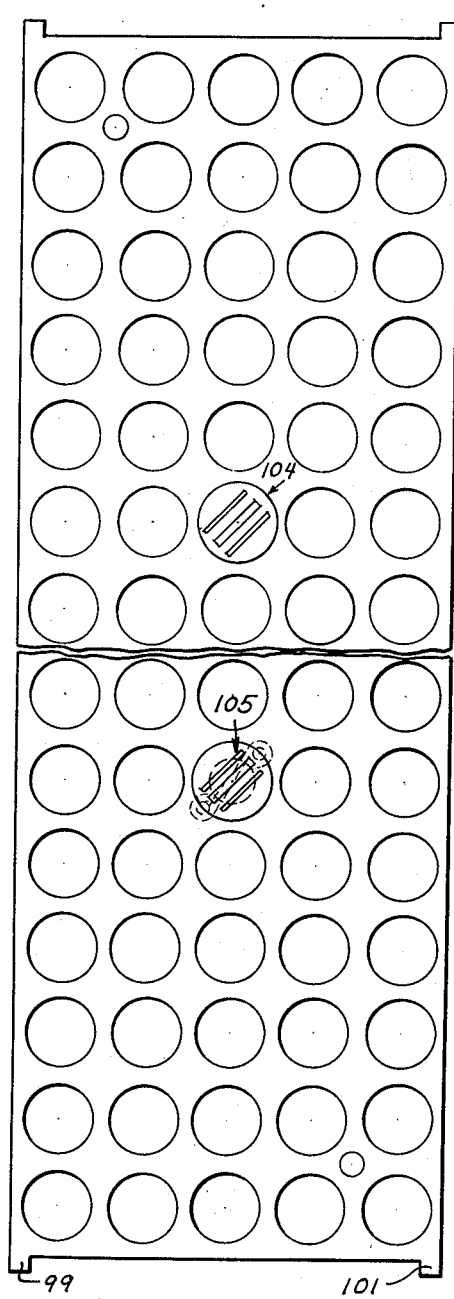
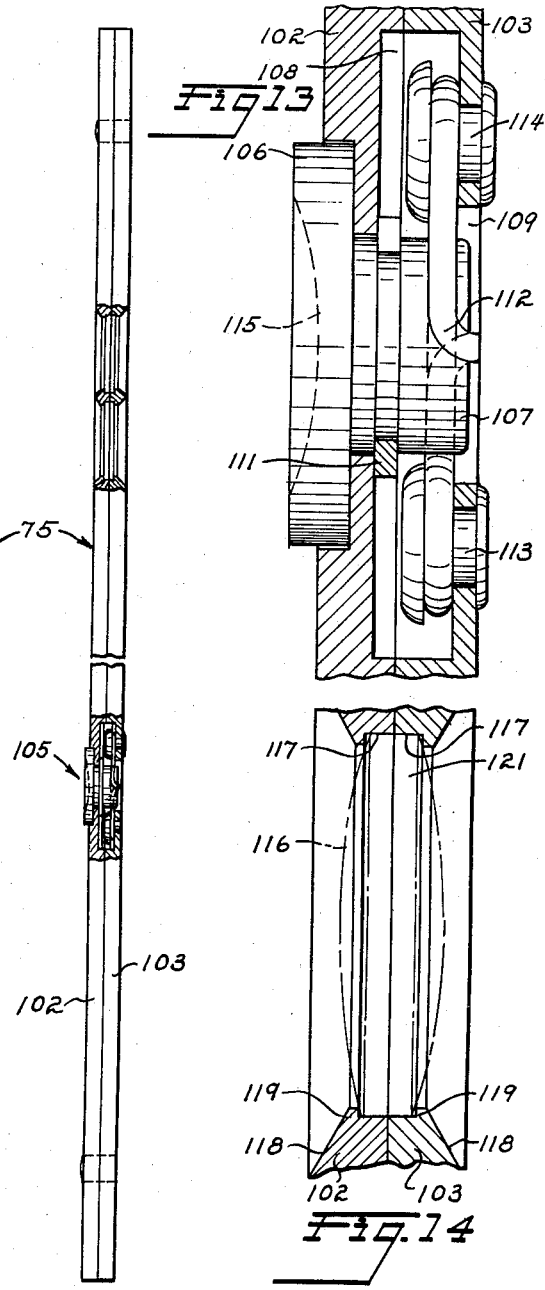
Nov. 10, 1959 — J. D. DANNER ET AL — 2,912,351
LENS COATING APPARATUS AND PROCESS
Filed Sept. 21, 1956 — 4 Sheets-Sheet 4
Fig. 11  Fig. 12  Fig. 13  Fig. 14
INVENTOR
JACK D. DANNER
GLENVILLE ROGERS
BY Strauch, Nolan & Neale
ATTORNEYS

United States Patent Office 2,912,351
Patented Nov. 10, 1959

2,912,351

LENS COATING APPARATUS AND PROCESS

Jack D. Danner, Whitmore Lake, and Glenville Rogers, Ann Arbor, Mich., assignors, by mesne assignments, to Sylvania Electric Products Inc., Wilmington, Del., a corporation of Delaware Application September 21, 1956, Serial No. 611,255

15 Claims. (Cl. 117—106)

This invention relates to apparatus and process for coating lenses and other optical surfaces with films of a transparent material to reduce surface reflection and is particularly concerned with a special relative arrangement of parts for locating the surfaces for optimum coating, coating both sides of an article during a single run and attendant details.

In its preferred embodiment the invention will be described as including a special bell jar enclosure within which lens supports are mounted in vertical array about a source of coating material and heaters. The apparatus to be described is particularly advantageous over those of the known art because it coats more articles per single run than the usual apparatus and thereby avoids waste of expensive coating material and it also enables both sides of the articles to be coated during the same run. In the apparatus pellets of a coating material such as magnesium fluoride are evaporated and the deposited film on the lens surface is a multiple of a quarter wave length of light in thickness.

It is therefore the major object of the invention to provide a novel coating apparatus and process for lenses and like articles wherein the articles are mounted in special vertical array with respect to the source of vaporized coating compound and the heaters.

A further object of the invention is to provide a novel lens coating apparatus and process wherein both surfaces may be coated by evaporation of a coating compound within an evacuated bell jar without opening the bell jar.

It is a further object of the invention to provide in a coating apparatus and method, novel mountings for the articles to be coated, the sources of coating material to be vaporized and the heater rods.

A further object is to provide a novel support for articles to be coated within an evacuated bell jar and means for automatically turning the support during a coating cycle for different surface coating.

A further object of the invention is to provide a novel article surface coating apparatus wherein the articles are mounted on a member that revolves about a vertical axis and the source of coating compound to be evaporated is mounted adjacent but eccentrically with respect to that axis.

It is a further object of the invention to provide a novel electrode mounting assembly in a lens or like coating apparatus.

A further object of the invention is to provide a novel lens rack turning arrangement in a coating apparatus.

It is a further object to provide a novel lens mounting rack structure.

A further object is to provide a novel counterweighted arrangement for raising and lowering the bell jar of a lens or like coating device.

Further objects will appear as the description proceeds in connection with the appended claims and the annexed drawings wherein:

Figure 1 is a vertical section through a lens coating apparatus according to a preferred embodiment of the invention showing the lens rack, heater and electrode arrangements within the bell jar;

Figure 2 is a horizontal section through the apparatus of Figure 1 showing the eccentric evaporation source and the drive mechanism;

Figures 3 and 4 are elevation views showing the counter-weighted bell jar raising and lowering arrangements;

Fig. 5 is a fragmentary section showing the lens rack turning mechanism;

Figures 6, 7, 8 and 9 are fragmentary views to show the sequential positions of the turning lens rack;

Figure 10 is an elevation of a lens rack holder;

Figure 11 is a front view of a lens mounting rack;

Figure 12 is a side elevation of the rack of Figure 11; and

Figures 13 and 14 are enlarged sections of detail of the rack of Figure 11.

A suitable rigid support table 11 is provided with a circular opening 12. A stainless steel housing 13 of the so-called inverted bell jar type is coaxially mounted over said opening and comprises a cylindrical metal side wall 14 integral with a domed top wall 15 and a thickened rim section 16. An annular deformable soft rubber or like sealing element 17 is provided between rim 16 and the smooth flat surface of table 11. The front of housing wall 14 is formed with a projecting boss 18 in which is removably clamped a transparent window 19 as by fastening elements 21.

The housing 13 except for its open bottom is gas tight and when seated on element 17 as shown in Figure 1 is sealed gas tight with the table 11. A tubular conduit section 22 is secured to the bottom of table 11 to provide a gas tight extension of opening 12 and a closure 23 is provided at the bottom. A side conduit 24 enters conduit 22 and is connected to a diffusion pump 25 that serves as a source of vacuum for evacuating the interior of housing 13.

Referring to Figures 3 and 4 housing 13 is removably secured upon the upper end of a vertical drive rod 26 as by a bolt 27 engaging a lug 28 rigid with the housing. The lower end of rod 26 is formed with rack teeth 29 meshed with a pinion 31 on the shaft of an electric motor 32, and rod 29 projects down through a hole in table 11. A bridge 33 is removably secured to drive rod 26 as by bolt 34 and the opposite sides of the bridge are formed with bores slidably receiving two parallel guide rods 35 and 36 which rigidly upstand from table 11. A counterweight 37 is fixed upon straps 38 and 39 slidably mounted on the rod 26 above bridge 33.

Thus as motor 32 is driven in one direction or the other the housing 13 may be raised vertically a distance at least equal to its full height as indicated in dotted lines in Figure 4 for the purpose of introducing or removing the lenses to be coated, being guided and prevented from rotating by sliding engagement of bridge 33 with rods 35 and 36. The counterweight 37 is disposed on the opposite side of rod 26 from housing 13 and is of such size as to counterbalance the weight of housing 13 during its vertical movement. The combined weight of housing 13 and counterweight 37 is usually adequate to maintain an air tight seal at rim 17 with the table 11 but further holding means may be provided as required.

Two parallel electrically conductive rigid copper rods 38 and 39 extend longitudinally substantially the height of the housing 13 and these rods are spaced and secured together at opposite ends by upper and lower rigid bars 41 and 42 of electrical insulation material. As shown in Figure 1 the lower ends of rods 38 and 39 project frictionally into sockets 43 and 44 respectively formed in conductive rods 45 and 46 respectively that are fixed upright in porcelain or like insulators 47 and 48 on closure 23 and are connected to opposite sides of the usual 110 volt electric power line 49 controlled by a suitable switch.

The upper ends of socket rods 45 and 46 are braced by passing through insulating bushings 51 and 52 carried by a support plate 53 removably secured to table 11 as by fasteners 54. Three filament supports 55 each comprise a horizontal conductive wire extending between rods 38 and 39 to which they are secured and each formed at its middle portion with a coiled filamentary wire section 56 that in operation serves as a receptacle for a pellet of $MgF_2$ to be vaporized by the heated filament coil at 56 as will appear. Filaments 55 are usually of tungsten wire.

The entire electrode assembly consisting of electrode rods 38 and 39 and insulators 41 and 42 is thus removably plugged into sockets 43 and 44 for ready removal whenever desired as to replace a filament wire. As shown in Figure 2, the sockets 43 and 44 are preferably located in a line parallel to a diameter of the housing 13 but slightly offset so that the various filamentary heater coils 56 although vertically aligned are eccentric with respect to the central axis of the bell jar identified at 57 in Figure 2. This is possible in large apparatus where the lenses move about the filaments, and where control of the evaporation distance is desired.

Surrounding the lower end of the electrode assembly is a heater support ring 58 that is removably secured to table 11 as by bolts 59. Ring 58 is formed with a horizontal flange 61 spaced above table 11 and provided with a circumferentially spaced series of plug-in sockets 62 in which are mounted the vertical electrical heater rods 63 that extend the major part of the housing height. In practice in a successful lens coating apparatus there is installed a total of fifteen such heater rods of 1500 watt capacity equally spaced around flange 61 in a circle concentric with axis 57 and serviced by suitable electric connections to a 220 volt, 60 cycle line (not shown) entering through table 11 or closure 23.

Heater support ring 58 is in turn surrounded by an annular drive ring assembly 64 having a cylindrical vertical skirt 65 extending between horizontal upper and lower flanges 66 and 67. At the lower end of skirt 65 the drive ring assembly is mounted in the flat table top by a series of rollers 68 journaled in horizontal axes in the skirt. A series of vertical axis rollers 69 on flange 61 of the stationary ring 58 laterally engage skirt 65. The periphery of lower annular flange 67 has gear teeth 71 meshed with a pinion 72 driven from electric motor 73 through a gear reduction 74. Thus when motor 73 is energized the entire drive ring assembly 64 rotates about axis 57 as a center.

A plurality of lens mounting racks 75 are mounted upright on essentially U-shaped holders 76. In the illustrated embodiment fifteen rack holders are equally spaced about the drive ring assembly with their shafts lying in a circle concentric with axis 57. Each holder has fixed to it a central depending vertical shaft 77 journaled in flanges 66 and 67 and held against axial movement, and means are provided for selectively automatically rotating these holders about their vertical shaft axes in a desired manner during lens coating.

Each rack holder shaft 77 has secured thereto in the space between flanges 66 and 67 a horizontal spider 78 having four arms 79, 80, 81 and 82 at right angles to each other, and aligned arms 79 and 81 are longer than aligned arms 80 and 82.

The relative positions of each rack holder and its associated spider are shown in Figure 6. It will be observed that a normal coating position is where one side or the other of the flat lens rack faces the electrode assembly as much as possible, and holder 76 is shown in one of its two normal coating positions wherein it is essentially tangential to the circle containing the centers of shafts 77. The spider arms then extend at 45° to the radius R passing from axis 57 through the center of shaft 77.

A pin 83 projects upwardly into the path of the outer long spider arm 79, being mounted on the end of a crank 84 rigid with a rotatable pivot post 85 upstanding from table 11. Pin 83 has two operative positions in which it may be disposed, one as illustrated in full lines in Figure 6 and the other in the dotted line position of Figure 6 where it is out of the path of the spider 78 when the assembly 64 is rotated. Suitable latch means for fixing the pin in either position are provided, controlled as by a manual lever 86 below the table 11.

As shown in Figure 2, the pin 83 is disposed remote from the drive gear 72. A second pin 87 near pin 83 extends upwardly in the path of the spider 78 and pin 87 is located far enough inwardly to be in the path of both arms of the spider 78. Pin 87 like pin 83 is fixed on a crank 88 rigid with a pivot post 89 that may be manually latched in the illustrated operative spider turning position or out of the path of the spider entirely like pin 83. Pin 87 is circumferentially located to act on the spider 78 as soon as pin 83 has fully performed its turning action.

Figure 10 shows the U-shaped lens rack holder which comprises a base 91 secured as by pin 92 to the upper end of shaft 77 that is journaled just below in flange 66. Upstanding parallel side arms 93 and 94 are rigidly secured to opposite ends of base 91 and just inwardly of these arms base 91 is formed with rectangular lens rack receiving sockets 95 and 96. At their upper ends arms 93 and 94 are provided with oppositely inclined throat defining surfaces 97 and 98 to guide the rack 75 into the space between the side arms.

Figures 11–14 illustrate the special lens racks which are thin flat rectangular assemblies provided at their lower corners with rectangular projections 99 and 101 adapted to enter sockets 95 and 96 in assembly. Preferably those projections are provided at both ends of the rack for reversibility.

Each rack 75 consists of two flat stainless steel plates 102 and 103 removably secured together by upper and lower fastener assemblies 104 and 105 shown in detail in Figure 13, and the lenses are clamped between the plates as shown in detail in Figure 14.

Referring to Figure 13 which shows the means for releasably holding plates 102 and 103 in flush contact, plate 102 is formed with a surface recess to receive the large head 106 of a stud 107 that projects through space 108 defined by similar internal surface recesses in the plates and into an opening 109 in plate 103. A snap ring 111 prevents axial shift of stud 107, and the stud extends into a spring socket of conventional type 112 disposed in space 108 and mounted by rivets 113 and 114 on plate 103. The stud head is slotted at 115 for reception of a tool to turn the stud tight or loose with socket 112. It will be appreciated that any reliable but quickly detachable connection may be used at 104 and 105 and that the foregoing is by way of example.

Figure 14 shows the mount of each lens 116. Each plate 102 and 103 is formed alike with an internal cylindrical recess 117, an external conical recess 118 and an intermediate circular lip 119 that defines the exposure opening of the lens to be coated, which lens is disposed in space 121 defined by the adjacent recesses 117 and engaged on opposite sides by the annular inner edges of lips 119 as illustrated.

Thus all that has to be done to prepare for coating is to place plate 102 flat on a surface, mount a clean uncoated lens in each recess 117 of the plate, then place plate 103 over the assembly with its recesses 117 fitting over the lenses, and then tighten the fastening means at 104 and 105. The rack 75 is now complete and ready for lens coating, and it is placed in vertical position for coating by sliding one end into a U-shaped holder 76 until the socketed ends are seated, the engaging flat opposite sides of the rack and holder arms preventing relative rotation of the holder and rack. Thus the holder 76 maintains rack 75 erect and vertical.

*Operation*

The electrode assembly, with pellets of a vaporizable lens coating material such as magnesium fluoride ($MgF_2$), is mounted upright in its socket as illustrated in Figure 1, heaters 63 are all mounted around flange 61, and the racks 75 containing clean surface lenses are mounted in the several holders 76. It will be noted that the vertical axis of shaft 77 bisects the rack above it. The normal position of the holders 76 is to dispose the racks tangentially with one side facing the center of the assembly. Then the bell jar 13 is lowered to seat fluid tight on table 11, the pump 25 operated to obtain the desired degree of vacuum within the interior of the bell jar, and the heaters 63 are energized to heat the lens surfaces as the first part of the coating cycle.

In the actual operating cycle the motor 32, the electric motor driving pump 25 and the circuit to heaters 63 are so connected into a relay arrangement that upon operation of a single control switch the motor 32 acts to lower the bell jar into place, the heaters 63 are energized, and the pump 25 is started, this condition existing until the proper coating vacuum and temperature is reached within the bell jar. During evacuation the temperature within the bell jar reaches and is held at about 425° F.

Then motor 73 is energized to slowly continuously rotate the drive ring assembly containing the lens racks, and the electrodes 38 and 39 are then energized to evaporate the magnesium fluoride tungsten filament pockets 56. This continues for a sufficient period to enable complete vaporization and deposit of the vaporized magnesium fluoride on the lens surfaces facing the sources.

The purpose of the mechanism shown in Figures 5–9 is to relatively locate the racks 75 in tangential or radial locations or to periodically reverse them 180° to obtain coating of both sides of the lenses in each rack 75 without opening up the bell jar or interrupting a run. Actually the racks can be initially mounted with holders 75 in substantially any position and, with pins 83 and 87 in operative position, the holders 75 can be all automatically rotated together to the tangential position shown in Figure 2 in no more than two revolutions of the drive ring 64, and if the pins are left there the racks 75 will be rotated 180° during each revolution of the drive ring.

This action can be seen from Figures 6–9. With drive ring 64 turning continuously and holder 76 oriented tangentially as shown, the long spider arm 79 will contact fixed pin 83 and be turned counterclockwise 90° to the Figure 7 position. Then with continued rotation of drive ring 64 the short arm 80 will sequentially engage fixed pin 87 that it is shown approaching in Figure 8, and the spider and holder 76 will be rotated counterclockwise another 90° to the Figure 9 position. This takes place once each revolution, so that the lens surfaces on both sides of the racks 75 are coated. Should the holder 76 be in any other position than shown in Figure 6 it will be rotated less than 90° upon contact of the spider with the first pin, and then the 90° step rotations will start.

When it is desired to coat both sides of the lenses, the pin 87 is first withdrawn and the driver ring rotated through a single revolution which will turn the racks to a radial position as in Figure 8, and this position is maintained during the heating step of the cycle, because the spider arms will not reach pin 80. Then during the coating step the 180° rotation is resumed with pin 87 back in its full line position of Figure 8.

Should it be desired to coat only one side of the lenses, in racks 75, both pins 83 and 87 may be withdrawn to their dotted line positions out of the path of the spider arms after the racks have set in their desired 180° position with the surfaces to be coated facing inwardly. When only one side of the lenses is to be coated the racks are held in tangential position broadside to the filaments during the heating step.

The eccentric or offset location of the filament coils 56 that function as sources of evaporated magnesium fluoride has proved to produce unlooked for beneficial results in that these sources during at least part of the rotation of the drive ring are located much closer to the surfaces to be coated than in the case where they are disposed on the axis of rotation, and since the amount of deposit on the lens surface is a direct function of the distance the invention enables the successful coating of lenses in large bell jars and without requiring excessive evaporation rates. Also it enables more lenses to be coated in small bell jars. Moreover by rotating the drive ring about the filaments 56 all of the lens surfaces to be coated are exposed to the filaments in the same manner so that uniform coating is obtained which renders coating independent of the location of the filaments, a fact that is not true when the filament itself rotates with respect to a stationary surrounding array of lenses as has been proposed. Also in the invention the filaments 56 can be located to change the mean free path of the molecules during evaporation which is important in a large device to secure proper coating.

The electrodes are usually energized for a sufficient period for complete vaporization and adequate coating and then if desired a relay may automatically operate the motor 32 to open up the bell jar and allow the operator to remove the lens racks 75 which may be simply pulled up out of the holders. The fasteners 104 and 105 are quickly detached to separate plates 102 and 103 and the coated lenses are ready for use.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for coating article surfaces, means providing a chamber having a reduced internal pressure, means mounting at least one source of evaporating coating compound within said chamber, means mounting a plurality of articles in surrounding relation to said source and for rotation about the source on a vertical axis within said chamber, and means operative during said rotation for automatically, periodically turning said articles into different predetermined positions relative to said source so that said articles may be coated on different surfaces during a coating run.

2. In a process for coating the surfaces of optical articles by deposit thereon of a film of transparent material of a predetermined thickness, the steps of moving the articles substantially continuously around an evaporation source of said material and automatically, periodically turning the articles during said movement to expose different surfaces to said source.

3. In a lens or like article coating apparatus, a stationary source of evaporating coating material, a mounting member rotatable about said source, a plurality of vertically disposed rotatably mounted article mounting racks on said mounting member, a plurality of electric heaters adjacent said mounting member for heating the article surfaces to be coated, means for driving said mounting member to move said racks bodily in a predetermined path about said source and means effective during said movement for turning each of said racks through a predetermined angle to present a different article surface toward said source.

4. In the apparatus defined in claim 3, said mounting member being a ring rotated about a vertical axis, and said source being radially offset with respect to said axis.

5. In the apparatus defined in claim 3, means automatically effective during said movement of said mounting member for periodically rotating said racks on said mounting member to different relative positions with respect to said source for coating different article surfaces during a single run.

6. In an evaporation coating apparatus for lenses and like articles, a bell jar type housing and means for reducing the pressure therein, a stationary electrode assembly mounted upright within said housing and provided with at least one energizable filament receptacle for receiving a charge of coating material to be evaporated, means within the housing mounting a plurality of vertically disposed article carrying racks surrounding said receptacle, means for moving said racks in a path around said receptacle during evaporation of said material, and means for turning each of said racks about a vertical axis at a predetermined time during movement along said path for presenting a different article surface toward said filament.

7. In the apparatus defined in claim 6, a plurality of upright stationary heater rods mounted within the housing and located between the receptacle and said racks.

8. In a coating apparatus for lenses and like articles, a support member, means for continuously rotating said member about a vertical axis, at least one article rack holder mounted on said member for rocking about a vertical axis spaced from said first axis, and means for controllably periodically rocking said rack holder during rotation of said member.

9. In the coating apparatus defined in claim 8, said means for rocking said rack holder comprising radial spider arms on said rack holder and pin means selectively interposed in the path of said spider arms as the support member rotates to be contacted by one or both of the spider arms.

10. In the coating apparatus defined in claim 9, said pin means being mounted for selective movement between an operative position in the path of said spider arms and an inoperative position out of said path.

11. In apparatus for depositing by evaporation a film of coating material on a vertical array of lenses or like articles, an inverted bell jar type housing, a support, a drive ring mounted on said support for rotation about a vertical axis, a plurality of racks rotatably mounted on said drive ring and adapted for mounting said articles, means for rotating said drive ring about said axis and for periodically rotating each rack about its axis of rotation, means for lowering said housing to enclose said articles and into sealing engagement with said support, means for raising said housing to permit insertion or removal of said articles, a fixed socket in said support, an electrode assembly removably plugged into said socket and extending upright within the lowered housing, and a plurality of filament receptacles on said electrode assembly disposed at different levels for receiving charges of a coating material to be evaporated.

12. In a coating apparatus for lenses and like articles, an annular member mounted for rotation about a vertical axis, a plurality of article rack holders mounted for periodic rotation on said member on a vertical axis, said holders being formed at their upper ends to removably mount an article containing rack and at their lower ends with a multi-armed spider.

13. In apparatus for depositing a film of evaporated material on the surfaces of a group of lenses or like articles, a support, an annular drive ring mounted for rotation on said support about a vertical axis, a plurality of vertically disposed article holders disposed in a row on said drive ring, means providing a stationary source of evaporated coating material inwardly of said ring, a series of upright heaters disposed in a row inwardly of said drive ring, and a bell jar adapted to be lowered into rim contact with said support and enclose said drive ring, source and heaters.

14. In a lens or like article coating apparatus, means providing a source of evaporating coating material, an annular member surrounding said source and rotatable about a vertical axis, a plurality of U-shaped rack holders mounted for rotation about vertical axes in a circular row on said annular member, means for periodically turning said rack holders about their axes, a plurality of vertically disposed flat article containing racks removably mounted on said holders, a plurality of heater rods mounted in a row surrounding said source and adjacent said racks, and a bell jar enclosure for the foregoing having an internal connection to a vacuum pump.

15. In a lens or like article coating apparatus, means defining a chamber internally connected to a source of vacuum, means in said chamber for providing a source of evaporated coating material, a support carrying a plurality of article racks arranged in a row about said source, means for continuously rotating said member about said source, and means for automatically rocking each article rack about an axis parallel to the axis of rotation of said member about 180° during each revolution of said member.

References Cited in the file of this patent

UNITED STATES PATENTS

| 2,239,452 | Williams et al. | Apr. 22, 1941 |
| 2,286,819 | Lee | June 16, 1942 |
| 2,532,971 | Van Leer et al. | Dec. 5, 1950 |
| 2,586,752 | Weber et al. | Feb. 19, 1952 |
| 2,769,728 | Juvinall | Nov. 6, 1956 |

FOREIGN PATENTS

| 1,065,922 | France | Jan. 13, 1954 |